United States Patent [19]

Shinozaki et al.

[11] 4,268,575

[45] May 19, 1981

[54] THERMAL RECORDING ELEMENTS

[75] Inventors: Fumiaki Shinozaki; Tomizo Namiki; Masao Kitajima; Tomoaki Ikeda; Yuzo Mizobuchi, all of Asaka, Japan

[73] Assignee: Fuji Photo Film Co., Ltd., Minami-ashigara, Japan

[21] Appl. No.: 64,465

[22] Filed: Aug. 7, 1979

[30] Foreign Application Priority Data

Aug. 7, 1978 [JP] Japan .................................. 53-96446

[51] Int. Cl.$^3$ .............................................. G01D 15/32

[52] U.S. Cl. .................................. 428/336; 346/76 L; 346/135.1; 346/137; 358/128.5; 428/64; 428/65; 428/339; 428/458; 428/460; 428/461; 428/462; 428/463; 428/913; 428/918

[58] Field of Search ................ 346/76 L, 77 R, 135.1, 346/137; 428/913, 336, 339, 65, 458, 460, 461, 462, 463, 918; 427/531, 162, 164, 165; 264/1; 358/128.5

[56] References Cited

U.S. PATENT DOCUMENTS

| | | | |
|---|---|---|---|
| 3,993,824 | 11/1976 | Shirahata et al. | 428/336 |
| 4,069,487 | 1/1978 | Kasai et al. | 346/135.1 |
| 4,074,282 | 2/1978 | Balon, Jr. et al. | 346/137 |
| 4,087,582 | 5/1978 | Shirahata et al. | 428/333 |
| 4,126,726 | 11/1978 | Soedem | 428/913 |
| 4,188,433 | 2/1978 | Dijnstra et al. | 428/913 |

FOREIGN PATENT DOCUMENTS

| | | | |
|---|---|---|---|
| 2558245 | 8/1976 | Fed. Rep. of Germany | 346/135.1 |
| 7804656 | 4/1978 | Netherlands | 346/135.1 |

OTHER PUBLICATIONS

Damm Jr. et al., Protective Coating for Optically Thin Recording Films, IBM Tech. Disclosure Bulletin, vol. 14, No. 12, May 1972, p. 3793.

*Primary Examiner*—Stanley S. Silverman
*Attorney, Agent, or Firm*—Sughrue, Rothwell, Mion, Zinn and Macpeak

[57] ABSTRACT

A thermal recording element comprising a support having formed thereon a recording layer and formed on the recording layer, a protective layer containing a polymer, and a higher fatty acid having 10 or more carbon atoms or an amide thereof present in or on the protective layer.

16 Claims, No Drawings

THERMAL RECORDING ELEMENTS

BACKGROUND OF THE INVENTION

1. Field of the Invention

The invention relates to a thermal recording element for recording information by thermally deforming the recording layer using high intensity radiation and, more particularly, it relates to a high density thermal recording element having a novel protective layer.

2. Description of the Prior Art

Various recording elements such as silver halide light-sensitive materials and others have been used as recording elements for recording using high intensity radiation such as a laser, etc., such as a recording element wherein the recording layer has a high optical density, which when heated locally in the irradiated portions by absorbing high intensity radiation undergoes physical deformation such as fusion, evaporation or aggregation, whereby information is recorded by the difference in optical density between the irradiated portions and non-irradiated portions. Such a thermal recording element has the advantages that processings such as development, fixing, etc., are unnecessary to form the recorded images, a dark room is unnecessary for recording since the recording layer is not sensitive to ordinary room light, high contrast images are obtained, and further addition recording (add on) of information is possible.

Recording using such a thermal recording element is generally performed by converting the information to be recorded into an electric time-succession signal and scanning the recording element by a laser beam the intensity of which is modulated according to the electric signal. The advantage of this recording method is that the recorded image is obtained in real time.

Recording elements such as described above are reported in, for example, M. L. Levene et al., *Electron, Ion and Laser Beam Technology* (the records of the 11th Symposium held in 1969), *Electronics,* p. 50 (March 18, 1968), D. Maydan, *The Bell System Technical Journal,* Vol. 50, 1761 (1971), C. O. Carlson, *Science,* Vol. 154, 1550 (1966), etc. Metals, dyes, plastics, etc., are used as the recording layers for the thermal recording elements. In the thermal recording elements using metals as the recording layers, there are elements constructed of a thin layer of a metal such as Bi, Sn, In, etc., on a support which is able to record images with high resolving power and high contrast. However, the recording element having a thin metal layer generally reflects more than 50% of the laser light used for recording making it impossible to utilize the energy of the laser light effectively and hence has such a demerit that the power of the laser light used for recording must be higher, which means the laser source must have a high output for recording at high scanning speed, and thus the recording apparatus used becomes larger and expensive.

Various recording elements having high recording sensitivity have been studied and as an example a recording element comprising a thin layer of Se and Bi and a thin layer of Ge formed thereon for reducing the light reflectance is disclosed in Japanese Patent Publication No. 40479/71. However, the use of Se, etc., is undesirable since there is a possibility of toxicity problems and the recorded images are unsatisfactory.

As another example of a recording element having a reflection preventing layer, the formation of a reflection preventing layer absorbing the light in the wavelength region of the laser on a metal recording layer is disclosed in Japanese Patent Application (OPI) Nos. 151151/75 (The term "OPI" as used herein refers to a "published unexamined Japanese patent application") and 74632/76. However, even if a reflection preventing layer is used, it is very difficult to completely eliminate light reflection and even if light reflection could be completely eliminated, a laser light source of high power would be required to produce thermal deformation and hence a recording element having higher sensitivity is needed.

Since the recording layer of the above-mentioned thermal recording element, in particular a metal layer used as the recording layer is liable to scratch, a protective layer is sometimes formed on the recording layer to prevent or reduce scratching. The protective layer must transmit the light beam of high energy density used for recording, possess high mechanical strength, be reluctant to react with the recording layer, exhibit good coating property and be easily formed. As materials used for protective layers, there are inorganic materials such as $Al_2O_3$, $SiO_2$, SiO, MgO, ZnO, $MgF_2$, $CuF_2$, etc., and the organic materials disclosed in Japanese Patent Application (OPI) Nos. 96716/74, 59626/76, 75523/76, 88024/76 and 134633/76. However, in recording elements having protective layers possessing effective strength as described in the above specifications the recording sensitivity is greatly reduced in comparison to recording elements having no protective layer. For example, when an effective polymer is used for the protective layer, the thickness of the protective layer must be at least 3 $\mu m$ in order to function adequately and in this case the recording energy required for recording on the recording element is two to three times the amount of energy required without the protective layer. On the other hand, when the thickness of the protective layer is less than 1 $\mu m$, the reduction in recording sensitivity as described above may be avoided but the mechanical strength of the recording element reduces greatly and, in fact, the recording element is not practical.

When an organic high molecular weight material or a polymer is used as the protective layer, it is necessary to prevent the reduction in recording sensitivity as much as possible and at the same time maintain the strength of the protective layer for practical use. When a polymer layer having good adhesive property with the recording layer, having good film-forming property and high softening point, the reduction in sensitivity is great. On the other hand, the formation of a protective layer having high faculty of protecting a recording layer and giving less reduction in recording sensitivity is in balancing properties which conflict with each other.

SUMMARY OF THE INVENTION

This invention is directed to overcoming the problems suurrounding the use of conventional thermal recording elements as mentioned above and the invention provides a thermal recording element having formed on a support a recording layer and a protective layer containing a polymer formed on the recording layer characterized in that a higher fatty acid having 10 or more carbon atoms or the amide thereof is present in or on the protective layer.

DETAILED DESCRIPTION OF THE INVENTION

The support used in this invention may be any support generally used in this type recording element. For example, it may be a plastic such as polyethylene terephthalate, polycarbonate, etc., a glass sheet, paper, a metallic sheet or foil, etc., and in particular, polyethylene terephthalate is particularly preferred since it is light in weight and is tough, has low elongating property, can form a very thin film, and is transparent.

It is preferred that the recording layer used in this invention is a layer having high optical density and is formed of a material having high covering power in a thin layer. A typical example of such a material is a metal. Also, the recording layer includes not only a layer of a material having a high covering power (e.g., a metal layer only) but also a laminate of a metal layer and a layer of another material used for increasing recording sensitivity, and a layer composed of a mixture of a metal and another material for increasing recording sensitivity. The recording layer is primarily responsible for the change in the optical transmission or light reflectance as the result of thermal deformation such as fusion, evaporation, aggregation, etc., in the portions irradiated by a laser beam and for the purpose various layer structures and materials may be selected.

As metals used for the recording layer in this invention, there are Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, Se, Te, etc., and they may be used alone or in combinations of two or more. The particularly preferred properties of the metals used in this invention as the recording layer are that low toxicity, the energy required for fusing or evaporating the metal layer is low, and the film or layer of the metal can be easily formed. The most preferred metals are Sn, Bi and In. The thin layer of the metals can be formed on a support or a subbing layer or other layer on the support in a single layer or double layers by various methods such as vacuum deposition, sputtering, ion plating, electroplating, electroless plating, etc., as a single metal or a combination or alloy of two or more such metals. Furthermore, the metal may be applied as a layer wherein the metal and a material for increasing the sensitivity exist as a physically mixed state by means of co-deposition together with the material.

The thickness of the metal layer should be capable of providing the necessary optical density for images and, for example, is generally about 300 to 1,500 Å depending on the kind of metal used. Also, in the case of forming the metal layer on a support by vacuum deposition, sputtering, ion plating, etc., the layer structure of the metal differs with the kind of the support, the temperature, the degree of the vacuum, the speed of vacuum deposition, etc., and hence the thickness of the metal layer necessary for obtaining a desired optical density depends on a combination of factors.

It is preferred that the metal is used together with a material which increases the recording sensitivity in the form of a mixture or a laminate of them. The material may increase the recording sensitivity by preventing reflection or other means, and as such materials, there are, for example, metal oxides such as $PbO$, $WO_3$, $TiO_2$, $SiO$, $SiO_2$, $ZrO_2$, etc.; chalcogen compounds such as Ge, In, Sn, Cu, Ag, Fe, Bi, Al, Si, Zn, V, etc.; metal halides such as $PbX_2$, $AgX$, $SnX_2$, $SbX_5$, $SbX_3$ (wherein X is fluorine, chlorine, bromine, iodine, etc.), etc.; and As, Sb, P, Ge, Si and Te. It is preferred that these materials have low toxicity, low hygroscopicity or deliquescence, or low deterioration with the passage of time by the dark reaction with the metal recording layer, and they can easily form a layer or film thereof. For the purpose, the use of GeS, SnS, $PbI_2$, etc., is particularly preferred. The thickness of the layer depends upon the kind of the metal used, the thickness of the metal layer, etc., but is usually about 50 to 1,000 Å.

The recording layer may be formed directly on a support or on a subbing layer formed on a support to improve the adhesive property with the recording layer. Suitable materials for the subbing layer include chlorinated polyolefins as described in Japanese Patent Application No. 77269/78 and inorganic materials as described in U.S. Patent Application Ser. No. 915,689, filed June 14, 1978. Furthermore, a layer increasing the recording sensitivity may be formed under the recording layer such as chlorinated polyethylene, chlorinated polypropylene, etc.

As the higher fatty acid having 10 or more carbon atoms or the amides thereof used in this invention, there are, for example, lauric acid, myristic acid, palmitic acid, stearic acid, behenic acid, oleic acid, linolic acid, linolenic acid, arachidonic acid and the amides of these acids. Of these, the higher fatty acids having 14 to 21 carbon atoms and the amides thereof are preferred. The carbon atom number used herein is the number of carbon atoms including the carboxy group in the higher fatty acid. These fatty acids or the amides may be used alone or as a combination of two or more acids or amides. Also, these components may be incorporated in the protective layer of a polymer described later or they may be provided (as a separate layer) on the layer of the polymer. When the fatty acid or amide is in the protective layer, it is preferred that the amount of the higher fatty acid or amide be about 0.1 to 20% by weight, preferably 0.2 to 2% by weight, based on the weight of the protective layer. Also, in the case of using as a layer coated on the protective layer of polymer, it is preferred that the thickness of the layer be about 0.1 to 1 μm, preferably 0.03 to 0.2 μm.

As the polymers used for the protective layer in this invention, there are various materials such as gelatin, gelatin derivatives, cellulose derivatives, dextrane, latex-like vinyl compounds for improving the dimensional stability of photographic materials, and the following synthetic polymers. That is, suitable synthetic polymers are described in U.S. Pat. Nos. 3,142,586, 3,193,386, 3,062,674, 3,220,844, 3,287,289 and 3,411,911. Examples of the effective polymers are the water-insoluble polymers of alkyl acrylate (herein the term "alkyl" refers particularly to alkyl groups having 1 to 7 carbon atoms), alkyl methacrylate, acrylic acid, sulfoalkyl acrylate, sulfoalkyl methacrylate, etc., and the polymers having cyclic sulfobetaine units as described in Canadian Pat. No. 774,054. Practical examples of the suitable polymers are polyvinyl butyral, polyacrylamide, cellulose acetate butyrate, cellulose acetate propionate, polymethyl methacrylate, polyvinyl pyrrolidone, polystyrene, chlorinated rubber, polyisobutylene, butadiene-styrene copolymer, vinyl chloride-vinyl acetate copolymer, vinyl chloride-vinyl acetate-maleic acid terpolymer, polyvinyl alcohol, polyvinyl acetate, benzyl cellulose, cellulose acetate, cellulose propionate, cellulose acetate phthalate, polyvinyl formal, polyvinyl pyridine, polyvinylidene chloride, methylvinylethermaleic acid anhydride copolymer, polyvinylacrylamide, cellulose acetate, cellulose nitrate, butyl cellulose, carboxymethyl cellulose, hydroxyethyl cellulose, nitrocellulose, polyethylene, polyethylene glycol, polyethylene oxide, polyacrylate, polysulfoalkyl, acrylate, polysulfoalkyl methacrylate, polyamide, terpene resin, alginic acid or the derivatives thereof, onium salt halide series conductive polymer, phenol resin, etc. These polymers may be used alone or in mixture. While the amount of polymer in the protective layer may vary depending upon the addition of additives in addition to the fatty acid or amide, generally the protective layer of the present invention contains 90% by weight or more of the polymer. Also, the above-mentioned higher aliphatic acid or the higher aliphatic acid amide may be added to the polymer. In any case, a protective layer of the polymer may be formed by dissolving the material in a known solvent and coating the solution.

The thermal recording element of this invention has the merit that the protection of the recording layer is improved without reducing the recording sensitivity and has the effect that the preservative property is improved and the formation of scratches during handling is greatly reduced.

Then, the invention will further be explained by the following examples. These examples are not to be construed as limiting. Unless otherwise indicated all parts, percents, ratios, etc., are by weight.

EXAMPLE 1

A recording layer having a two layer structure was formed by forming first a metal layer of Sn of 350 Å on a polyethylene terephthalate film of 100 μm thickness and then a layer of the compound shown in Table 1 under the condition of $5\times10^{-5}$ Torr. The transmission optical density of each sample thus prepared was in the range of 1–2. The samples at this stage are referred to as samples $A_1$ to $A_8$.

Then, a toluene solution of chlorinated polyethylene ("LTA-905", chlorine content of 65–69% by weight, the viscosity in a 20 wt% toluene solution at 25° C. of 4–7 cps, made by Sanyo Kokusaku Pulp Co., Ltd.) was coated on one surface of each of the samples at a dry thickness of 3 μm. The samples at this stage are referred to as samples $B_1$–$B_8$.

On the other hand, the layer of the chlorinated polyethylene as described above was coated on one surface of each of samples $A_1$–$A_8$ at a dry thickness of 0.6 μm. The samples in this stage are referred to as samples $C_1$–$C_8$. Furthermore, a solution of 1 g of stearic acid and 0.3 g of behenic acid as organic fatty acids in 2 liter of hexane was coated on the surface of each of samples $C_1$–$C_8$ at a dry thickness of 0.05 μm. The samples in this stage are referred to as samples $D_1$–$D_8$.

Each of these samples was recorded by scanning the recording layer side thereof with an argon ion laser beam (wavelength 5145 Å) focused at a beam diameter of 25 μm by a lens at a scanning speed of 19 meters/sec, and the minimum laser output intensity forming a record of 10 μm diameter on each sample was determined. The surface strength of each recording element sample was measured by means of "HEIDON-18" surface strength tester, made by Shinto Kagaku K.K. using an R ball stylus (R=0.4 mm) and the minimum load forming scratch on the surface when a load is applied thereon was employed as the indicator for the surface strength.

The results are shown in Table 1.

TABLE 1

| Recording Layer | | | Minimum Output Required (mW) | | | | Surface Strength (g) | | | |
|---|---|---|---|---|---|---|---|---|---|---|
| Metal Layer Material | Compound Layer Material | Sample No. | $A_n$ | $B_n$ | $C_n$ | $D_n$ | $A_n$ | $B_n$ | $C_n$ | $D_n$ |
| (thickness Å) | (thickness Å) | | | | | | | | | |
| Sn (350) | $PbI_2$ (200) | 1 | 100 | 275 | 125 | 125 | 5 | 70 | 50 | 1,500 |
| " | CuI (300) | 2 | 100 | 275 | 125 | 125 | 5 | 70 | 50 | 1,500 |
| " | AgI (350) | 3 | 100 | 275 | 125 | 125 | 5 | 70 | 50 | 1,500 |
| " | $SnI_2$ (200) | 4 | 100 | 275 | 125 | 125 | 5 | 70 | 50 | 1,500 |
| " | AgCl (300) | 5 | 100 | 275 | 125 | 125 | 5 | 70 | 50 | 1,500 |
| " | SnCl (400) | 6 | 100 | 275 | 125 | 125 | 5 | 70 | 50 | 1,500 |
| " | GeS (200) | 7 | 175 | 275 | 225 | 225 | 5 | 70 | 50 | 1,500 |
| " | SnS (150) | 8 | 200 | 275 | 250 | 250 | 5 | 70 | 50 | 1,500 |

As is shown in Table 1, in samples $B_1$–$B_8$ each having a chlorinated polyethylene layer 3 μm thick on the recording layer, the surface strength was passably high as compared with samples $A_1$–$A_8$ but the minimum laser output required was high, i.e., the recording sensitivity was very poor. In samples $C_1$–$C_8$ each having the polyethylene layer 0.6 μm thick, the recording sensitivity was almost same as that of samples $A_1$–$A_8$ respectively but the surface strength was inferior to samples $B_1$–$B_8$. However, in samples $D_1$–$D_2$ of this invention, the recording sensitivity was same as that of each the C samples and also the surface strength was very high.

EXAMPLE 2

The same procedure as in Example 1 was followed using Bi in place of Sn as the metal layer and almost the same results as in Example 1 were obtained.

EXAMPLE 3

A recording layer was formed on a polyethylene terephthalate film of 100 μm thickness by vacuum depositing thereon Sn at a thickness of 350 Å as a metal layer and GeS at a thickness of 200 Å as a compound layer under the condition of $5\times10^{-5}$ Torr. The sample in this stage is referred to as sample A.

Then, on each of two A samples was coated the following solution (1) of the polymer shown below or solution (2) of the polymer shown below as a protective layer at a thickness of 3 μm and 0.6 μm, respectively.

Solution (1): 10% toluene solution of polystyrene.

Solution (2): 10% methyl ethyl ketone solution of polyurethane ("Estan 5715", made by Goodrich Co.).

These samples thus formed are shown in Table 2.

TABLE 2

| Thickness of Protective Layer | Solution Coated | |
|---|---|---|
| | Solution (1) | Solution (2) |
| ($\mu$m) | | |
| 3 | Sample $B_1$ | Sample $B_2$ |
| 0.6 | Sample $C_1$ | Sample $C_2$ |

On each of samples $C_1$ and $C_2$ was further coated a solution of 1 g of stearic acid and 0.3 g of behenic acid in 2 liters of hexane at a dry thickness of 0.05 $\mu$m. The sample at this stage is referred to as sample $D_1$ and sample $D_2$.

The minimum output of laser required for laser recording and the surface strength were measured for these samples and results are shown in Table 3.

TABLE 3

| Sample | Laser Output (m. watt) | | | | Surface Strength (g) | | | |
|---|---|---|---|---|---|---|---|---|
| | A | B | C | D | A | B | C | D |
| 1 | 175 | 450 | 225 | 225 | | 70 | 15 | 1,500 |
| 2 | | 450 | 225 | 225 | | 500 | 100 | 1,500 |

EXAMPLE 4

On sample $C_2$ in Example 3 was coated stearic acid amide dissolved in turpentine oil at a dry thickness of 0.05 $\mu$m. When the same test as in Example 1 was applied to the sample, the minimum output of laser required for laser recording was 225 m. watt and the surface strength was 1.5 kg. That is, as is clear by the comparison with the case of sample $D_2$ in Example 3, when the higher fatty acid amide was used in place of stearic acid, etc., the same results as in the case of using the higher fatty acid were obtained.

EXAMPLE 5

Recording elements were prepared by the same manner as in the case of preparing samples $C_1$ and $C_7$ in Example 1 using the coating composition having the following formula in place of the chlorinated polyethylene layer as the protective layer.

| | |
|---|---|
| Chlorinated Polyethylene (same as in) Example 1) | 4 g |
| Methyl Ethyl Ketone | 50 g |
| Methyl Cellosolve Acetate | 50 g |
| Stearic Acid | 30 mg |

The same tests as in Example 1 were carried out on these samples and the same results as in Example 1 were obtained. That is, in the sample of this invention corresponding to sample $C_1$, the recording laser output was 125 m. watt and the surface strength was 1.5 kg and in the sample of this invention corresponding to sample $C_7$, the recording laser output was 225 m. watt and the surface strength was 1.5 kg. Thus, it was confirmed that when the higher fatty acid amide was used in place of the higher fatty acid as well as when the higher fatty acid or higher fatty acid amide was contained in the protective layer in place of coating on the recording layer, the same results as above were obtained.

EXAMPLE 6

When stearic acid amide was used in place of stearic acid in Example 5, the same results as in Example 5 were obtained.

While the invention has been described in detail and with reference to specific embodiments thereof, it will be apparent to one skilled in the art that various changes and modifications can be made therein without departing from the spirit and scope thereof.

What is claimed is:

1. In a thermal recording element having formed on a support a recording layer which yields an image on thermal deformation under high intensity irradiation due to a difference in optical density between irradiated areas and non-irradiated areas and a protective layer containing an organic high molecular weight material formed on the recording layer, the improvement wherein a higher fatty acid having more than 10 carbon atoms or the higher fatty acid amide thereof is present in or on the protective layer.

2. The thermal recording element of claim 1, wherein said support is polyethylene terephthalate.

3. The thermal recording element of claim 1, wherein said recording layer is a metal layer.

4. The thermal recording element of claim 3, wherein said recording layer is a layer of Sn, Bi or In.

5. The thermal recording element of claim 3, wherein said recording layer is a layer of GeS, SnS or $PbI_2$.

6. The thermal recording element of claim 1, wherein said higher fatty acid is lauric acid, myristic acid, palmitic acid, stearic acid, behenic acid, oleic acid, linolic acid, or arachidonic acid.

7. The thermal recording element of claim 1, wherein said fatty acid or amide is present in the protective layer.

8. The thermal recording element of claim 1, wherein said fatty acid or amide is present on the protective layer.

9. The thermal recording element of claim 1, wherein said improvement comprises said fatty acid present in or on the protective layer.

10. The thermal recording element of claim 1, wherein said improvement comprises said fatty acid amide present in or on the protective layer.

11. The thermal recording element of claim 1, wherein said recording layer is a laminate of a layer of metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, Se and Te and a layer of another material for increasing recording sensitivity selected from the group consisting of metal oxides, chalcogen compounds, metal halides, As, Sb, P, Ge, Si and Te.

12. The thermal recording element of claim 11, wherein said metal is Sn, Bi or In and said another material is GeS, SnS or $PbI_2$.

13. The thermal recording element of claim 1, wherein said recording layer is a layer composed of a mixture of a metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, Se and Te and another material for increasing recording sensitivity selected from the group consisting of metal oxides, chalcogen compounds, metal halides, As, Sb, P, Ge, Si and Te.

14. The thermal recording element of claim 13, wherein said metal is Sn, Bi or In and said another material is GeS, SnS or $PbI_2$.

15. The thermal recording element of claim 1, wherein said improvement comprises said higher fatty acid or amide being in said protective layer in an amount of about 0.1 to 20% by weight based on the weight of the protective layer.

16. The thermal recording element of claim 1, wherein said improvement comprises said higher fatty acid or amide thereof being used as a layer coated on said protective layer at a thickness of about 0.01 to 1 μm.

* * * * *

UNITED STATES PATENT AND TRADEMARK OFFICE

CERTIFICATE OF CORRECTION

PATENT NO. : 4,268,575

DATED : MAY 19, 1981

INVENTOR(S) : FUMIAKI SHINOZAKI ET AL

It is certified that error appears in the above-identified patent and that said Letters Patent are hereby corrected as shown below:

Column 4, line 42, delete "0.1" and add therefor --0.01--.

Column 8, line 28, following "acid," add --linolenic acid--.

Signed and Sealed this

*Tenth* Day of *November 1981*

[SEAL]

*Attest:*

GERALD J. MOSSINGHOFF

*Attesting Officer* *Commissioner of Patents and Trademarks*